United States Patent [19]
Buth et al.

[11] Patent Number: 5,860,632
[45] Date of Patent: *Jan. 19, 1999

[54] ENCAPSULATED CONTROL ASSEMBLY AND MANUFACTURING PROCESS

[75] Inventors: Martin E. Buth, Blytheville, Ark.; Steve Tenhundfeld, Germantown, Tenn.

[73] Assignee: Borg-Warner Automotive, Inc., Sterling Heights, Mich.

[*] Notice: The term of this patent shall not extend beyond the expiration date of Pat. No. 5,358,215.

[21] Appl. No.: 542,924

[22] Filed: Oct. 13, 1995

Related U.S. Application Data

[62] Division of Ser. No. 241,081, May 11, 1994, abandoned, which is a division of Ser. No. 83,155, Jun. 25, 1993, Pat. No. 5,358,215.

[51] Int. Cl.$^6$ .............................. F16K 31/06; H01F 41/02
[52] U.S. Cl. ..................................... 251/129.15; 29/602.1; 29/605; 335/260
[58] Field of Search ......................... 251/129.01, 129.15, 251/129.21, 368; 335/260; 29/592.1, 602.1, 605, 606

[56] References Cited

U.S. PATENT DOCUMENTS

| | | |
|---|---|---|
| 3,771,852 | 11/1973 | Kantorski et al. . |
| 4,398,785 | 8/1983 | Hedrick . |
| 4,922,965 | 5/1990 | Meister ........................... 251/129.21 X |
| 5,027,846 | 7/1991 | Baron .............................. 251/129.21 X |
| 5,137,677 | 8/1992 | Murata . |
| 5,185,919 | 2/1993 | Hickey . |
| 5,204,044 | 4/1993 | Yoneshige . |
| 5,338,602 | 8/1994 | Sheer et al. . |
| 5,358,215 | 10/1994 | Buth et al. ......................... 251/129.21 |
| 5,462,622 | 10/1995 | Small et al. . |

*Primary Examiner*—Kevin Lee
*Attorney, Agent, or Firm*—John A. Artz, Esq.; Greg Dziegielewski, Esq.

[57] ABSTRACT

A process for manufacturing a control assembly including a control assembly having electric windings and cooperating control elements wherein a sealant is applied to conductors and other portions extending from the assembly, the windings and other control elements being adapted to be placed in an injection mold, and wherein an encapsulation is formed by injecting plastic material into the mold, the encapsulation comprising the sealant to form a hermetic seal.

13 Claims, 2 Drawing Sheets

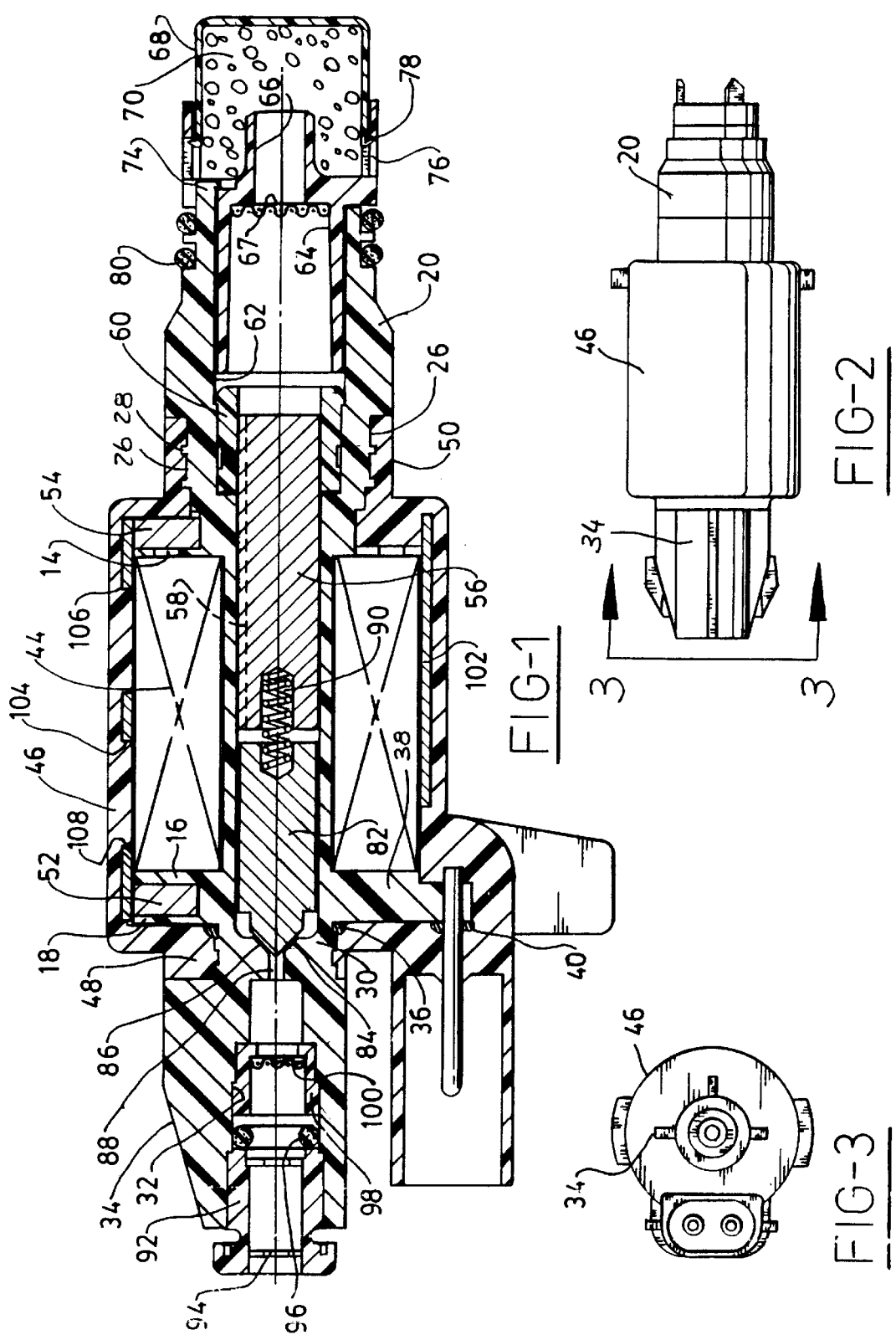

ENCAPSULATED CONTROL ASSEMBLY AND MANUFACTURING PROCESS

REFERENCE TO RELATED DISCLOSURE

This application is a division of U.S. patent application Ser. No. 08/241,081, filed May 11, 1994, now abandoned, which is a division of U.S. patent application Ser. No. 08/083,155, filed Jun. 25, 1993, , now U.S. Pat. No. 5,358, 215, entitled "ENCAPSULATED SOLENOID OPERATED VALVE ASSEMBLY".

TECHNICAL FIELD

The invention relates to improvements in solenoid assemblies for electrical control systems.

BACKGROUND OF THE INVENTION

The improved solenoid valve assembly of our invention may be adapted especially for controlling transfer of a fluid, including a pneumatic fluid such as air, in an automatic air suspension system for an automotive vehicle. The solenoid valve assembly allows for delivery of air from an air spring of the suspension system when the vehicle height is lowered. The vehicle height can be raised as an air compressor delivers actuating pressure through the valve assembly to the air spring. This may occur, for example, on vehicle start-up or when the vertical load on the vehicle suspension is increased.

The valve assembly in an installation of this type normally is located in a receptacle in the end cap of the air spring. When it resides at that location, it is subjected to water and other contaminants, such as road salt, etc., that are present in the vicinity of the wheel well for the vehicle. It thus is necessary to provide protection of the valve assembly from the elements to resist contamination and deterioration of the valve assembly.

BRIEF DESCRIPTION OF THE INVENTION

Our invention comprises improvements in a control assembly, such as a solenoid valve assembly that is adapted for use in an air spring assembly in an automatic suspension system for an automotive vehicle and to a process for manufacturing it. An improved sealing structure of a preferred embodiment of our invention comprises a silicone sealant material that is applied to a spindle portion of the assembly and an encapsulating material that surrounds the assembly as well as the sealant material.

The encapsulating material is injected into a mold into which the assembly is placed. The sealant material is injected under a pressure that is sufficient to apply a pressure force on the silicone sealant so that a permanent barrier will be formed between the spindle portion of the assembly and the encapsulating material after the assembly is removed from the molding die.

The assembly of a preferred embodiment includes also a mounting boss located at one axial end of the spindle. The boss is adapted to be fitted in an opening formed in a molded receptacle that forms a part of the end cap of an air spring. A fluid fitting is located at the end of the assembly opposite from the end location of the boss to permit a fluid connection between the outlet side of an air compressor and the inlet side of the solenoid valve assembly.

BRIEF DESCRIPTION OF THE FIGURES OF THE DRAWINGS

FIG. 1 is a cross-sectional assembly view of a solenoid valve assembly embodying the improvements of our invention;

FIG. 2 is a plan view of the assembly of FIG. 1 showing the exterior of the encapsulation following the molding operation;

FIG. 3 is an end view of the assembly of FIG. 2 as seen from the plane of section line 3—3 of FIG. 2;

PARTICULAR DESCRIPTION OF THE INVENTION

Figure 6:
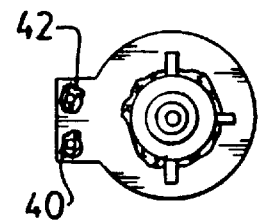
FIG. 6 is an end view of the spindle shown in FIG. 5 as seen from the plane of section line 6—6 of FIG. 5.
Figure 5:
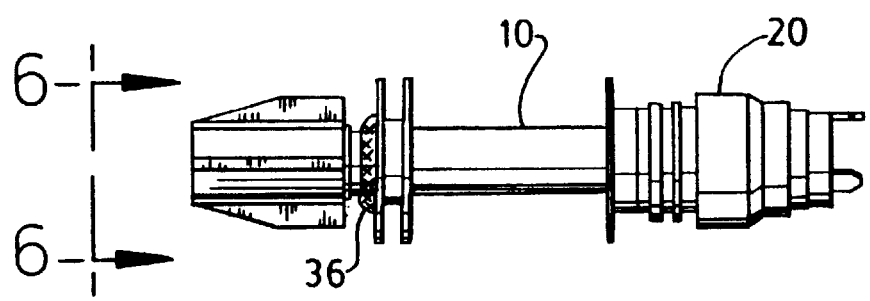
FIG. 5 is a top view of the spindle shown in FIG. 4 as seen from the plane of section line 5—5 of FIG. 4.
Figure 4:
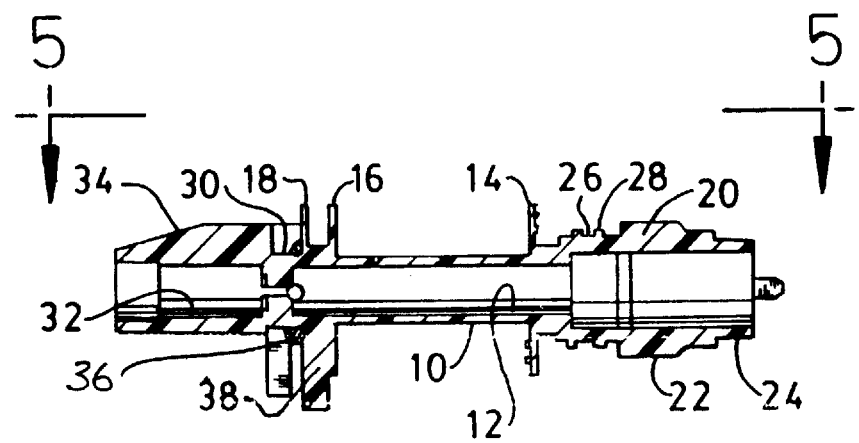
FIG. 4 is a subassembly view of the spindle that forms a part of the assembly of FIG. 1.

The spindle of FIGS. 4, 5 and 6 comprises a cylindrical central portion 10 having a valve opening 12. Plastic ribs 14, 16 and 18 extend radially from the portion 10. Enlarged hub portion 20 is located at the right end of the cylindrical portion 10. It has a large diameter portion 22, a first small diameter portion 24 and a second small diameter portion 26. Circular ribs 28 surround the small diameter portion 26.

At the left side of the rib 18, the spindle is formed with a reduced diameter portion 30. The reduced diameter portion 30 extends axially and defines an opening 32 adapted to receive an end of a pressure line, which will be described with reference to FIG. 1.

The spindle is formed of molded natural nylon, 30% glass-filled. After the molding operation, the molded part is removed and a bead of silicone material is deposited, as shown at 36, around the periphery of the reduced diameter portion 30, on the left side of the rib 18. A terminal support 38 extends radially from the spindle portion 10, as seen in FIG. 4. As will be described with reference to FIG. 1, the portion 38 is provided with openings that receive terminals for the electrical windings of a solenoid coil. The terminals or conductors are seen in FIG. 6 at 40 and 42.

As the bead of silicone is applied, as seen in FIG. 5, silicone is applied also to the base of the terminals.

After the terminals are installed, as seen in FIG. 1, the spindle is wound with multiple windings 44 of copper wire of approximately 18 gauge. The wire is coated with an insulating shellac in the usual fashion. The ends of the windings are attached to the terminals, one end being soldered to one terminal and the other end being soldered to the other terminal.

After the spindle is wound to form the solenoid coil, it is placed in a mold. The mold is designed with an interior cavity with dimensions that exceed the radial dimensions of the spindle and the windings. Heated nylon material is injected into the mold to form an encapsulation, as seen in FIG. 1. The outer portion 46 of the encapsulation surrounds the windings of the coil, and the end portion 48 of the encapsulation surrounds the reduced diameter portion 30 of the spindle. The right hand end of the encapsulation defines a portion 50 that surrounds reduced diameter portion 26 of the boss 20. The encapsulating material, like the material of the spindle, is a natural nylon, 30% glass-filled plastic. As the encapsulating material flows under pressure into the mold, it compresses the silicone material thus forming a tight seal between the spindle and the silicone material. The silicone material also is compressed at the base of the terminals 40 and 42.

As seen in FIG. 1, a steel washer 52 is positioned between the ribs 16 and 18 prior to the encapsulation process step. A similar washer 54 is inserted around the reduced diameter portion 10 on the right side of the flange 14. The washers 52 and 54 form a part of the flux flow path for the solenoid valve assembly. A coil housing made of steel surrounds the windings.

A metal solenoid core 56 is situated within the opening 12 in the central portion 10 of the spindle. The core is fixed with respect to the spindle and is provided with one or more grooves 58 extending axially from one end to the other. The right end of the fixed core 56 is received in a tubular guide 60 which is located within a cylindrical opening 62 in the boss 20. The right end of the opening 62 receives a cylindrical adapter 64 having an end opening 66 over which a screen 67 extends. The end 66 is received in a filter can 68, which contains filter foam material 70.

The adapter 64 is secured to end tangs 74 on the boss 20. It is provided with radial openings 76 which receive retainer tabs 78 formed on the can 68 thereby holding the filter in place.

The boss 20 is adapted to be received in a cylindrical opening in a molded receptacle at the end cap for the air spring of the suspension. O-ring seals 80 surround the reduced diameter portion 24 of the boss 20 to establish a seal.

FIGS. 2 and 3 show the encapsulated assembly. The encapsulation provides a hermetic seal for the windings, the valve portions, the terminals and the washers 52 and 54. When the assembly is removed from the die, the core piece 56 is inserted, as shown in FIG. 1. Prior to that step, a movable valve element 82 is inserted in the central opening of the spindle. The nose of the valve element 82 is provided with a tapered section 84 which is adapted to register with a conical surface 86 at the end of the central opening 32 described with reference to FIG. 4.

The valve element 82 is formed with a clearance with respect to the opening 12 in the spindle. A spring 90 located in spring pockets, formed in the valve element 82 and in the core piece 56, normally urges the valve element 82 in a left hand direction into registry with the orifice 88.

A coupling sleeve 92 is received in the opening 32 as seen in FIG. 1. An O-ring carried by the sleeve 92 is received in an annular groove in pressure line 94. The O-ring that registers with the annular groove is shown at 96.

A screen element 98 is received in the opening 32 as seen in FIG. 1. It is provided with a screen 100 at one end thereof.

When the solenoid is energized, electromagnetic force causes the valve member 82 to shift in a right hand direction, thereby opening the orifice 88. This permits passage of air from the compressor, the outlet of which is connected to pressure line 94, through the orifice 88, past the valve element 82 and through the grooves 58 to the air spring side of the assembly. This raises the suspension. If the suspension is to be lowered, air may pass in the opposite direction through the orifice and through exhaust porting in the compressor as the compressor is deactivated. If the solenoid windings 44 are de-energized, the valve closes thereby maintaining a desired pressure in the air spring, which maintains the vehicle suspension at its proper height.

After the terminals are inserted in the molded spindle and after the spindle is wound and soldered, the washers and the cover for the windings are installed. The cover, seen in FIG. 1 at 102, is generally cylindrical and it surrounds the windings. It is provided with openings, as seen at 104 and 106 and 108. Thus, during the injection of the encapsulating material, the openings 104, 106 and 108 are filled with nylon. The nylon encapsulating material also flows around the reduced diameter portion 26 of the boss 20 surrounding the ribs 28.

After the assembly is removed from the mold, the encapsulating material cools. Shrinkage occurs at this time. Because of the compression of the silicone material, the shrinkage of the encapsulating nylon material will not create an undesirable leakage point where the encapsulation material contacts the spindle material. Thus, the interior of the encapsulated assembly will not be exposed to water or other contaminants and the durability and operating reliability of the assembly is greatly enhanced.

The sealant is applied in liquid form to the spindle at one axial side of the windings. The electrical windings can be placed on the spindle before the sealant is deposited on the spindle. Also, the process of manufacturing the solenoid assembly includes curing the sealant to harden the sealant.

After the silicone sealant is applied, it is cured before the spindle is inserted into the mold. It is cured under ultraviolet light for one to two minutes. At that time, the sealant material turns from liquid form to a near solid state as molecular bonding occurs. The sealant material preferably is a silicone sealant manufactured by Loc Tite Corporation of Newington, Conn. It is referred to in the industry as NUVA-SIL sealant.

Having described a preferred embodiment of our invention and what we claim and desire to secure by U.S. Letters Patents is:

We claim:

1. A process for manufacturing a solenoid valve assembly comprising molding a spindle from nylon material, winding electrical windings around said spindle;

applying a sealant in liquid form to said spindle at one axial side of said windings;

curing said sealant to harden the sealant;

placing said spindle and said windings in a mold;

injecting plastic material into said mold thereby surrounding said windings and said spindle with nylon and encapsulating said windings and said spindle upon injection of said plastic material into said mold as said plastic material compresses said sealant against said spindle.

2. The process as set forth in claim 1 wherein said plastic material is natural nylon with approximately 30% glass filler.

3. The process as set forth in claim 1 wherein the step of molding said spindle includes forming a flow restricting orifice at the center of said spindle, said valve assembly including a valve element adapted to register with said orifice whereby fluid flow through said orifice is controlled as voltage is applied to said windings.

4. In a process for manufacturing a control assembly comprising an electric coil, control elements adapted to be activated in response to electromagnetic field effects of said coil when the latter is energized, at least one electric conductor including a conductor for said coil, the steps of:

applying a sealant liquid form to said conductor;

enclosing said coil and said control elements in a mold;

injecting plastic material into said mold thereby surrounding said coil and said control elements with plastic material as said plastic material compresses said sealant against said conductor thereby forming a hermetic seal for said assembly; and removing said control assembly from said mold.

5. The process as set forth in claim 1 wherein said plastic material is nylon and said sealant material is silicone.

6. The process as set forth in claim 4 further comprising the step of curing said sealant by exposing said sealant to ultraviolet light thereby hardening the sealant before injecting plastic material into said mold.

7. In a process for manufacturing a control assembly comprising control elements adapted to be activated in response to application thereto of a control voltage, at least one electric conductor extending to said control elements, the steps of:

applying a sealant in liquid form to said conductor;

enclosing said control element in a mold;

injecting plastic material into said mold thereby surrounding said control elements with plastic material as said plastic material compresses said sealant against said conductor thereby forming a hermetic seal for said assembly.

8. The process set forth in claim 7 wherein the step of enclosing said control elements in a mold is preceded by the step of curing said sealant to harden the sealant.

9. The process as set forth in claim 8 wherein said curing step comprises exposing said sealant to ultraviolet light.

10. The process as set forth in claim 9 wherein said sealant material is silicone.

11. An electric control assembly comprising relatively displaceable control members, an electric coil, one of said control members being movable relative to the other by electromagnetic forces created by said coil when the latter is energized, at least one electrical conductor for said assembly, one of said control members having a portion remote from said coil;

sealant material surrounding said remote control member portion; and an encapsulation enclosing said actuator coil and said one control member and compressing said sealant material against said remote control member portion, the latter extending outward from said encapsulation, thereby hermetically sealing said control assembly.

12. The combination as set forth in claim 11 wherein said conductor extends outward from said encapsulation, said sealant material surrounding said conductor, said encapsulation compressing said sealant material against said conductor to effect a seal between said encapsulation and said conductor.

13. An electric control assembly comprising an electric coil and control members adapted to be activated by electromagnetic effects created by said coil when the latter is energized, at least one electrical conductor for said assembly including a conductor for said coil extending outward from said assembly;

sealant material surrounding said outwardly extending conductor; and an encapsulation enclosing said coil and said outwardly extending conductor, said encapsulation compressing said sealant material against said outwardly extending conductor to effect a seal between said encapsulation and said outwardly extending conductor.

* * * * *